United States Patent [19]
Horvath

[11] 3,771,544
[45] Nov. 13, 1973

[54] AQUARIUM SYPHON
[76] Inventor: Tibor Horvath, Brooklyn, N.Y.
[22] Filed: Mar. 5, 1973
[21] Appl. No.: 338,289

Related U.S. Application Data
[63] Continuation-in-part of Ser. No. 186,298, Oct. 4, 1971, abandoned.

[52] U.S. Cl. .............................. 137/151, 210/169
[51] Int. Cl. ............................................ F04f 10/00
[58] Field of Search ................... 137/128, 131, 135, 137/138, 140, 142, 150.5, 151, 152; 210/169

[56] References Cited
UNITED STATES PATENTS

| | | | |
|---|---|---|---|
| 1,025,608 | 5/1912 | Bliss | 137/135 |
| 3,261,471 | 7/1966 | Halpart | 210/169 |
| 1,493,498 | 5/1924 | Pluym | 137/152 |
| 201,134 | 3/1878 | Uhlich | 137/135 |
| 3,011,510 | 12/1961 | Standifild | 137/151 |
| 2,341,129 | 2/1944 | Thompson | 137/151 X |
| 554,798 | 2/1896 | Rowland | 137/140 |

Primary Examiner—Frank A. Spear, Jr.
Assistant Examiner—T. A. Granger
Attorney—Peter L. Tailer

[57] ABSTRACT

A syphon is used with an aquarium tank and a separate filter tank, water being pumped from below filter material in the filter tank into the aquarium tank, the syphon having a long leg discharging filtered water near the bottom of the aquarium tank and having a short leg in the filter tank with a check valve at the end of the short leg preventing flow into the short leg allowing the syphon to have its short leg removed from the filter tank so the filter tank may be serviced, the check valve holding water in the syphon so it will automatically start on replacing the short leg in the filter tank, the check valve having a casing containing an upward facing valve seat, a valve guide containing a valve guide aperture over the valve seat, and a spherical valve engaging the valve seat and having a stem loosely extending through the valve guide aperture.

4 Claims, 11 Drawing Figures

Patented Nov. 13, 1973
3,771,544
2 Sheets-Sheet 1
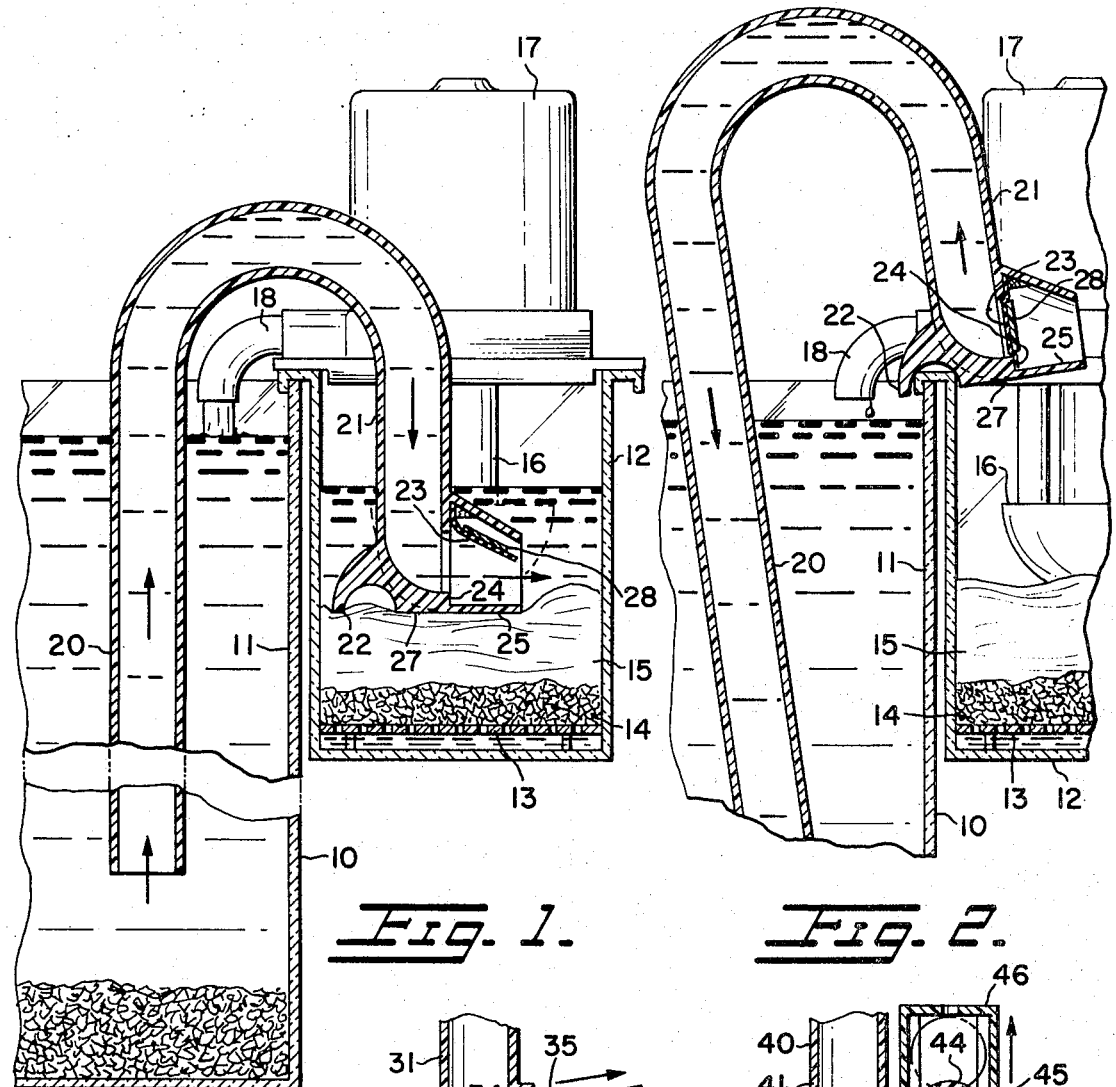
Fig. 1.
Fig. 2.
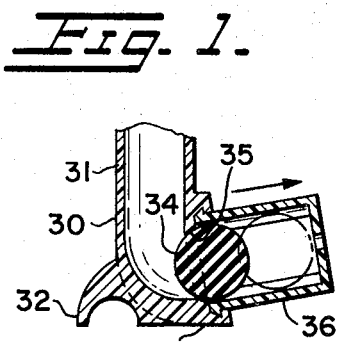
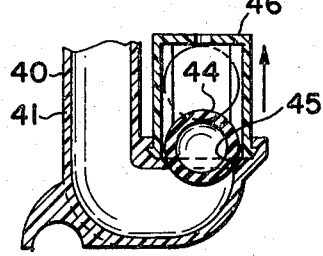
Fig. 3.
Fig. 4.
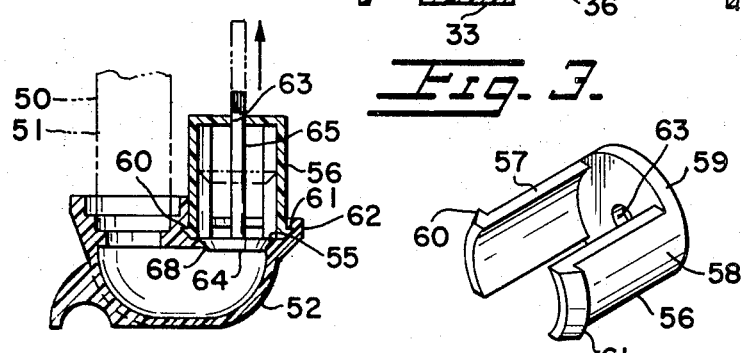
Fig. 5.
Fig. 6.
INVENTOR.
TIBOR HORVATH
BY 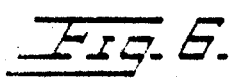
ATTORNEY.

Patented Nov. 13, 1973
3,771,544
2 Sheets-Sheet 2
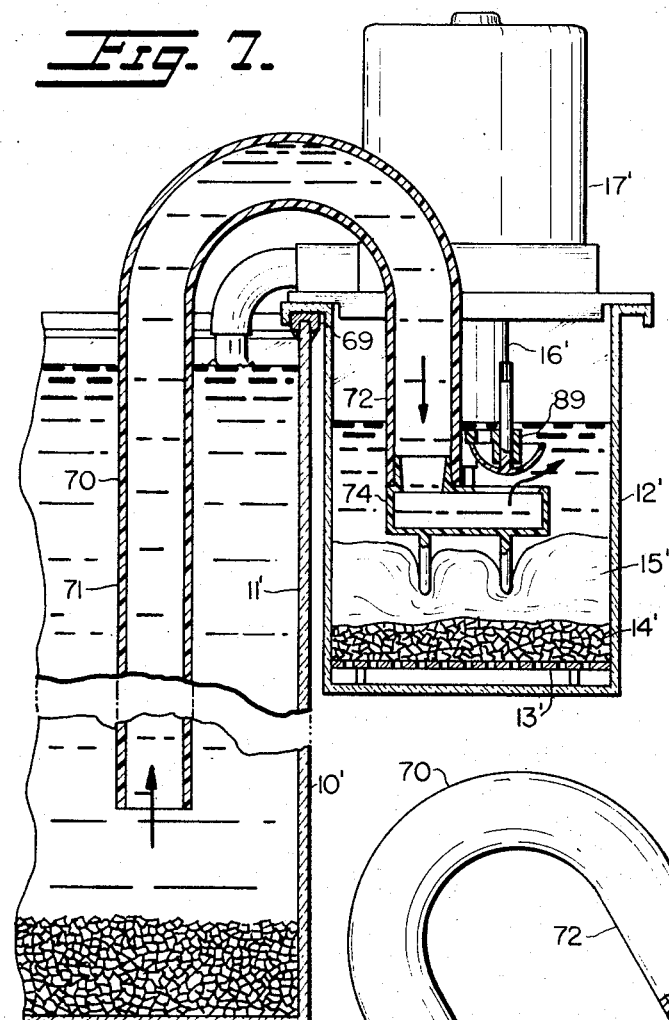
Fig. 7.
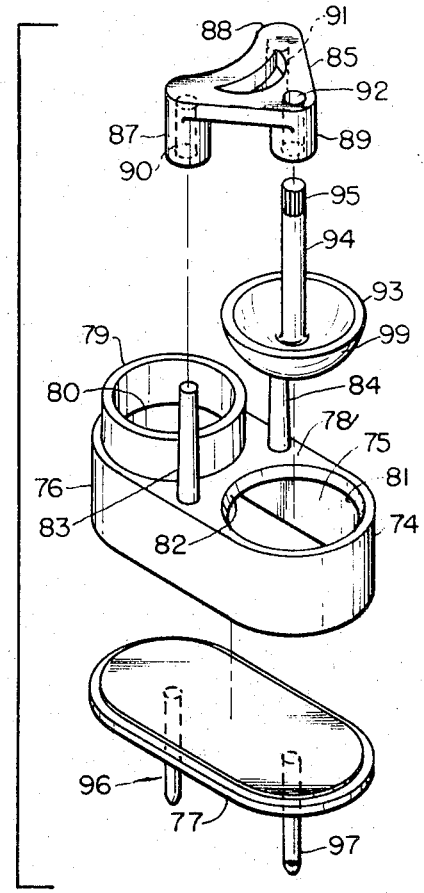
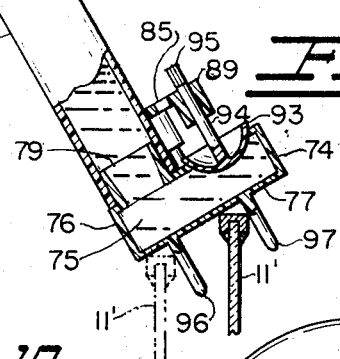
Fig. 8.
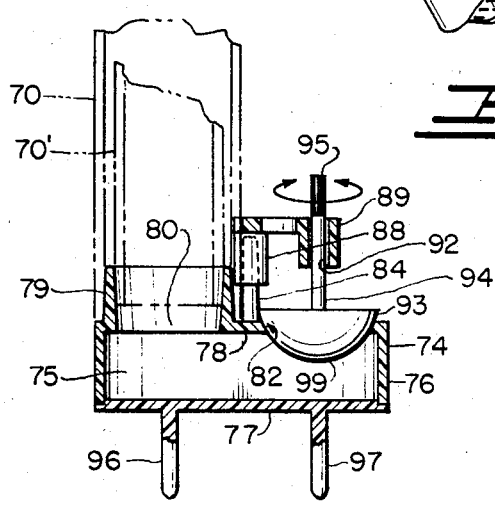
Fig. 9.
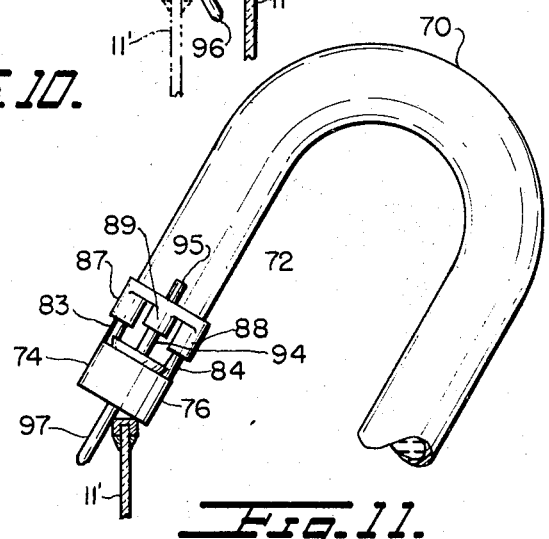
Fig. 11.

3,771,544

AQUARIUM SYPHON

CROSS-REFERENCES TO RELATED APPLICATIONS

This application is a continuation-in-part of my patent application Ser. No. 186,298 filed Oct. 4, 1971 and now abandoned.

BACKGROUND OF THE INVENTION

It is often desirable to remove an aquarium syphon which conducts water from the bottom of an aquarium tank into a filter tank having a lower water level produced by the action of a filter pump. The syphon may have to be removed from the filter tank to change filter material or to allow the syphon function to be performed by a suction cleaning device. Replacing a syphon of the conventional type when it is removed from the filter tank is difficult as it must be filled with water to operate.

SUMMARY OF THE INVENTION

The syphon of this invention has a check valve on its short leg to hold water in the syphon when the short leg is removed from the filter tank. The check valve has an upward facing valve seat in a casing fixed to the short leg, it has a valve guide containing an aperture disposed over the valve seat, and it has a valve with a spherical lower surface engaging the valve seat, the valve having a stem extending loosely through and above the valve guide aperture.

This construction enables the valve to be rotated by its stem against the seat to clear scum from the contact area between the valve and its seat. This is vital in an aquarium environment to maintain tight contact after several weeks of operation.

In addition, this construction enables the check valve to be manufactured with relatively crude tolerances as when molded in plastic and assembled. Misalignment of the valve stem does not prevent complete circular contact of the spherical valve with its seat.

BRIEF DESCRIPTION OF THE DRAWING

FIG. 1 is a vertical section through a fragment of an aquarium tank, an attached filter tank, and a syphon shown in operation according to this invention;

FIG. 2 is a vertical section through a fragment of an aquarium tank and a fragment of a filter tank showing a syphon removed from the filter tank allowing the filter tank to be serviced;

FIGS. 3, 4, and 5 are, respectively, vertical sections through filter tank ends of syphons showing modifications of this invention;

FIG. 6 is a perspective view of the valve guide of the syphon of FIG. 5;

FIG. 7 is a vertical section through a syphon according to the preferred embodiment of this invention and through a filter tank and a fragment of an aquarium tank between which the syphon extends;

FIG. 8 is an exploded, perspective view of the check valve of the syphon shown in FIG. 7;

FIG. 9 is a vertical section through the check valve of the syphon of FIG. 7 with two sizes of syphon tubing shown fixed thereto in phantom lines;

FIG. 10 is a side view of a fragment of a syphon partially broken away in section shown resting on a fragment of the edge of an aquarium shown in section, an alternative position of the syphon being shown resting on another fragment of the edge of an aquarium shown in phantom lines; and FIG. 11 is a side view of a broken away end of a sypon having a check valve thereon rotated 90° and shown resting on a fragment of the edge of an aquarium shown in section.

DESCRIPTION OF THE PREFERRED EMBODIMENTS

As shown in FIGS. 1 and 2, an aquarium tank 10 has a wall 11 from the outer side of which hangs the relatively small filter tank 12. Filter tank 12 contains a perforated base plate 13 on which rests the two main layers of filter material 14 and 15 which are usually charcoal and a fiberous material. A pump 16 driven by motor 17 draws water from below the base 13 and pumps it through a return tube 18 into aquarium tank 10. Pump 16 lowers the water level in filter tank 12 so that a syphon 19 keeps it filled from tank 10. This action continuously passes water from tank 10 through the filter material 14 and 15.

The syphon has a long leg 20 extending into aquarium tank 10 and a short leg 21 extending into filter tank 12. The aquarium leg 20 should extend substantially to the bottom of tank 10 to draw water to be filtered from the bottom of tank 10 and provide good circulation. When the filter material 14 and 15 is changed or when a tank cleaning device is to be substituted for syphon 19, an inward extending hook 22 of leg 21 is placed on top of wall 11. A horizontal exit portion 23 of leg 21 contains a hinged flap valve 23 which seats against shoulder 24. When the syphon is removed from the filter tank, as shown in FIG. 2, valve 23 closes as the flow in the syphon attempts to reverse. This traps water in the syphon so that it will automatically start when leg 21 is again immersed in filter tank 12. When the syphon 19 automatically starts, water flows as shown in FIG. 1 opening flap valve 23.

The valve 23, as well as the valves shown in other embodiments of this invention, must be very easily opened as the water pressures involved are very low. The horizontal exit portion 25 of leg 21 prevents filter material 14 and 15 from interfering with flow from leg 21. A flat bottom surface 27 of leg 21 is provided to rest on the filter material 14 and 15 and support the syphon.

FIG. 3 shows the end of a filter tank leg 30 of a modified syphon 31. Syphon 31 has a hook 32 and a flat bottom surface 33 to rest on filter material. A solid ball 34, considerably more dense than water, rests against a seat 35. A slightly inclined ball guide 36, similar to that shown in FIG. 6, snaps in place about seat 35. The inclined guide 36 allows the slight pressures involved to roll the solid ball 34 away from seat 35 to allow water to flow.

FIG. 4 shows a filter tank leg 40 of a modified syphon 41. Syphon 41 is similar to syphon 31 except that its seat 45 faces directly upward to have the ball guide 46 snap in place about it. A hollow ball 44, only slightly more dense than water, is moved upward to allow water to flow. Removal of syphon 41 from a filter tank allows ball 44 to seat and trap water for automatic starting.

FIG. 5 shows a filter tank leg 50 of a syphon 51. Syphon 51 is similar to syphon 31 except that it has a separately attached lower end 52 having an upward facing conical seat 55. A valve guide 56, shown in FIG. 6, snaps in place about seat 55. Guide 56 has two supports 57 and 58 formed integrally with top 59 which contains a valve guide aperture 63. Supports 57 and 58 flex inward to have their hooked ends 60 and 61 snap outward and become secured in the upturned end 62 of leg 50. Disk valve 64 has a conical edge 68 which rests in seat 55. Guide stem 65 extends from disk valve 64 through guide aperture 63. Any scum or deposits which may form after a long period of use on seat 55 or on the edge 68 to prevent the complete closing of valve 64 may be cleared by rotating edge 68 against seat 55 by turning valve guide stem 65. The slight water pressures available easily lift valve disk 64 and its stem 65 to allow flow through the syphon 51.

Referring now to FIGS. 7–11, aquarium 10' having a side wall 11' with a rim 69 thereon has a filter tank 12' hooked to it. Filter tank 12' contains a pump 16' driven by motor 17' as has been described in connection with the embodiment of FIG. 1. Filter tank 12' contains a perforated base plate 13' on which rest the layers of filter material 14' and 15'. A syphon 70 has a long leg 71 extending into aquarium tank 10' and a short leg 72 extending into filter tank 12'.

Syphon check valve 74, which represents a preferred embodiment of this invention, has a chamber 75 formed by the oblong side wall 76 and an oblong base 77 which is glued or otherwise secured to the lower edge of wall 76. One end of the top 78 of chamber 75 has a collar 79 extending upward about an opening 80. Collar 79 tapers inwardly and outwardly to accommodate two sizes of tubing 70 and 70' as shown in FIG. 9. About an opening 81 at the other end of top 78 there is formed a conical valve seat 82. Two molded tapered projections 83 and 84 extend upward between the openings 80 and 81.

A valve guide 85 has a plate 86 integrally molded with three bosses 87, 88, and 89. Bosses 87 and 88 contain the blind apertures 90 and 91 which receive the projections 83 and 84 to fix guide 85 with its through guide aperture 92 over seat 82. A valve 93 having a spherical lower surface 99 has a stem 94 which extends loosely through and projects above guide aperture 92. The upper projecting end 95 of stem 94 is serrated so that it can be grasped by the fingers and rotated to clear scum from the contact circle between seat 82 and the spherical lower surface 99 of valve 93. Valve 93 always makes a good contact with seat 82 as its alignment is not critcal. If in assembly of check valve 74 aperture 92 is offset slightly from the axis of seat 82, perfect contact will still be made between surface 99 and seat 82.

The base 77 has two integrally molded projections 96 and 97 projecting downward from it. As shown in FIGS. 10 and 11, these downward projections 96 and 97 may be used to hook the syphon 70 to the side wall 11' of an aquarium tank 10' when the short leg 72 if the syphon is removed from the filter tank 12'.

What is claimed is:

1. For use with an aquarium tank, a filter tank associated with said aquarium tank, layers of filter material in said filter tank, and a pump drawing water from said filter tank below said layers of filter material and returning filtered water to the aquarium tank; a syphon comprising, in combination, a long leg of said syphon reaching substantially to the bottom of said aquarium tank, a short exhaust leg of said syphon connected to said long leg and extending into said filter tank, and a check valve fixed at the bottom of said short leg opening to allow water to flow therefrom, said check valve closing on removal of said short leg from said filter tank trapping water in said syphon so that said syphon automatically starts on replacing said short leg in said filter tank, said check valve having a closed side wall, a top, a base, said wall, said top, and said base forming a chamber, a collar formed on said top to receive said short leg, said top containing a first opening within said collar and a second opening forming a circular valve seat, a valve guide containing a guide aperture, means mounting said valve guide so that said guide aperture is disposed over said valve seat, a valve element having a lower spherical surface and a vertically arranged stem, the stem of said valve element extending upward loosely through said guide aperture and extending above said valve guide to be grasped by the fingers of a user to rotate said valve against said seat.

2. The combination according to claim 1 wherein said means mounting said valve guide comprises upward projections from said top and wherein said valve guide contains apertures receiving said upward projections thereby mounting said valve guide.

3. The combination according to claim 2 wherein said collar has an inward and an outward taper to selectively receive two sizes of said syphon.

4. The combination according to claim 2 wherein said base has at least one downward projection to hook said check valve on the edge of said aquarium tank when said said short leg is removed from said filter tank.

* * * * *